United States Patent Office 3,376,648
Patented Apr. 9, 1968

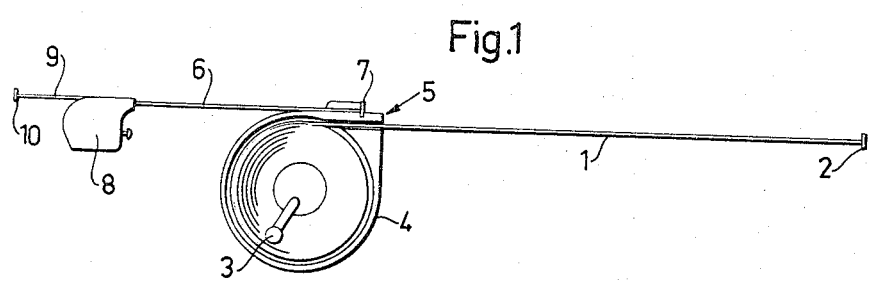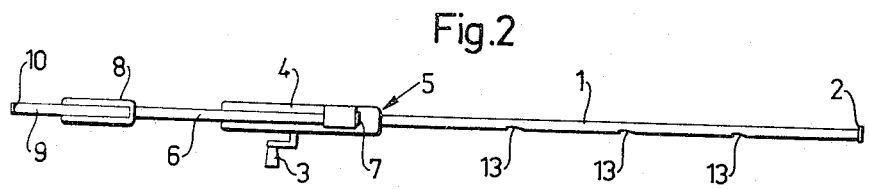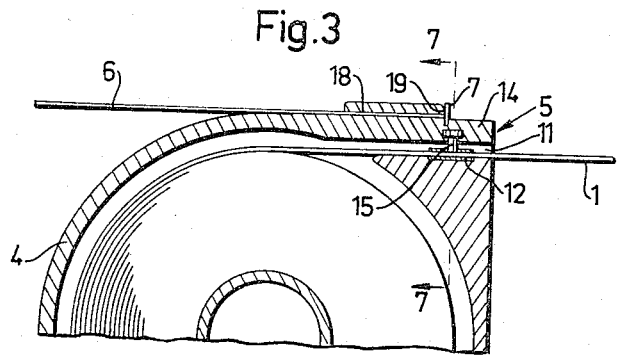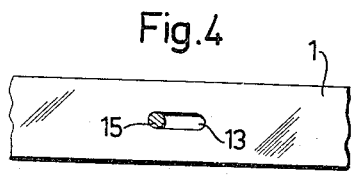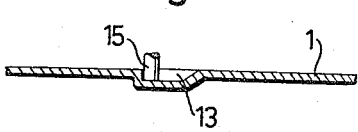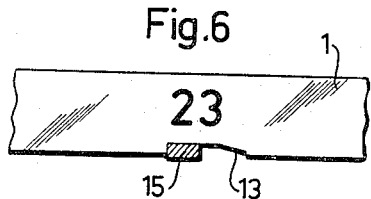

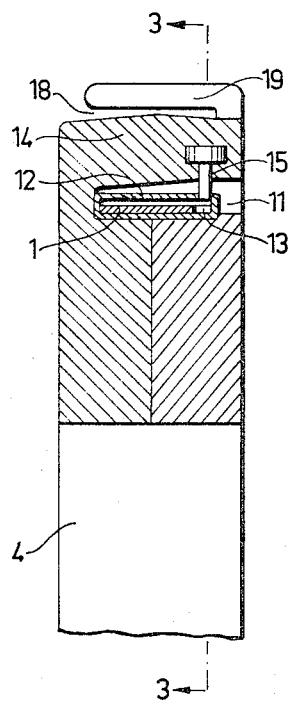
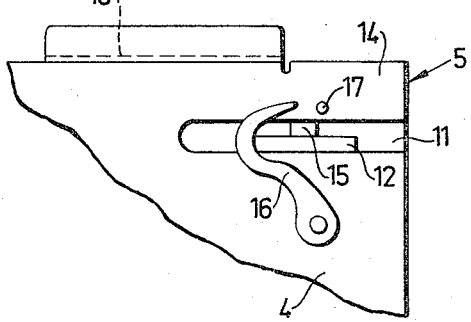
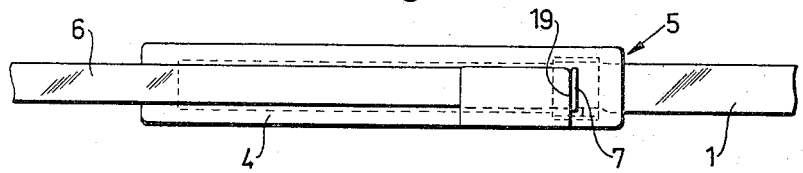

3,376,648
MEASURING DEVICES
Ture Anders Ljungberg, Badstigen 6, Stuvsta, Sweden
Filed Nov. 29, 1965, Ser. No. 530,742
Claims priority, application Sweden, Dec. 9, 1964,
14,856/64
8 Claims. (Cl. 33—138)

ABSTRACT OF THE DISCLOSURE

A tape measure especially useful for measurement between confronting surfaces comprises a pair of tapes extensible in opposite directions from a spool. The longer tape has coarse graduations and the shorter tape has fine graduations, so that the longer tape need not be finely graduated. The coarse graduations are discontinuities in the surface of the tape which may be selectively locked to fix the principal increments of measurement, while the other tape is extended to read the fine increments. The shorter tape is secured by an enlargement at one end thereof releasably in a slot in the housing for the longer tape thereby accurately to position the fixed end of the shorter tape.

---

The invention relates to tape measures of the type comprising a measuring tape which can be wound onto a spool and having coarse as well as fine division markings (e.g. meters, centimeters and millimeters, or yards, feet, inches and eighths of an inch). With this type of tape measure the cost and labor involved in providing the whole length of the tape with such division markings can be considerable. Furthermore it is difficult to form the divisions with sufficient accuracy, and continual use of the tape measure results in wear which tends to erase or obliterate the division markings.

The above stated difficulties of providing numerous division markings can be overcome by providing finely divided markings (centimeter and millimeter or inch and eighth of an inch) at only the beginning of the tape in the region of a unit of the coarsest division markings (meter or yard).

By using as a starting point at one measuring point, one of the coarse division markings, one can read-off from the fine division markings at the beginning of the scale at the other measuring point.

One of the disadvantages of such a procedure is that in measuring the distance between two walls, for example, the tape has to be bent at both measuring points whereby the accuracy of measurement is considerably impaired.

The object of the present invention is to provide an improved tape measure in which the above stated difficulties and disadvantages are overcome, and with this object in view the tape measure according to the present invention comprises two parts separably connected to one another, one of which parts consists of a first measuring tape windable onto a spool and having divisions formed by notches, indentations or the like, while the other part consists of a second measuring tape with, for example, printed divisions, the first tape being considerably longer than the said second tape and divided into larger measuring divisions than in said second tape, and wherein said two parts are connected together in such a manner that the connection of the ends of the measuring tapes only takes place at positions so selected that the second measuring tape provides a variable extension of a selected number of complete measuring divisions of the first measuring tape.

In order that the invention may be more clearly understood one particular embodiment thereof will now be described, by way of example, with reference to the accompanying drawings in which:

FIGURE 1 is a side elevation of the measuring device.
FIGURE 2 is a plan view thereof.
FIGURE 3 is a part section on the line 3—3 in FIGURE 7 drawn to a larger scale, of a housing which contains the long tape and shows the connection of the two parts of the measuring device.
FIGURES 4 and 5 are a top view and a longitudinal section respectively of a part of the tape having a pressed-in indentation at a measuring marking.
FIGURE 6 is a top view of a part of the long tape having an edge recess or notch as a measuring marking.
FIGURE 7 is a cross section on the line 7—7 in FIGURE 3.
FIGURE 8 is a plan view corresponding to FIGURE 3, and
FIGURE 9 shows a detail in side elevation.

Referring to FIGURES 1 and 2 of these drawings the measuring device comprises a long tape 1, whose free end is preferably provided with a measuring ridge 2. By means of a handle 3, the tape can be wound up onto a spool in known manner, into a housing 4 from which it can be withdrawn through an opening 5. The tape 1 is connected to a removable shorter measuring strip which likewise consists of a tape 6 having a measuring ridge 7 at its free end. This shorter tape 6 can be provided, in known manner, with a printed division and can be wound-up onto a spool in its own housing 8. Preferably, this housing for the shorter tape 6, is provided with a short folding rear tape length 9 which extends from the housing in a direction opposite to that of the remainder of the tape 6 and has a measuring ridge 10 at its free end. The shorter strip 6–10 is preferably constructed as described and illustrated in U.S. Patent 2,684,534. On the shorter tape there is a finely divided section which corresponds in length to at least one measuring unit of the coarse division of the longer tape 1.

The longer tape 1 consists preferably of a thin flat steel band which can be pulled-out through the opening 5 in its housing 4. The opening 5 contains a lateral open channel 11 through which the tape passes, and the tape is guided by a suitable guide 12. As shown in FIGURES 4–6, the tape is provided with one discontinuous edge, said edge being divided by spaced markings in the form of notches, indentations or the like 13 which are spaced from each other by a distance corresponding to a larger measuring unit. These notches, indentations or the like can be in the form of holes, pressed-in depressions, cut-away notches or the like and are numbered in a series of measuring units to indicate the length of the portion of tape withdrawn from the housing 4. This longer tape 1 carries no other scale and need not be provided with any other markings. The part of the housing in which the opening 5 is formed is preferably made from a material having some small degree of flexibility, e.g. from polyethylene or rubber so that the upper portion 14 can be pressed down somewhat towards the lower portion. A small stud or pin 15 is mounted in this upper portion 14 and extends into the channel 11 and serves to engage in the notches, indentations or the like 13 in the tape and thus to retain the latter temporarily, in predetermined positions corresponding to complete measuring units.

The notches, indentations or the like 13 are, as shown in FIGURES 4–6, preferably somewhat elongated so that by pressing down the upper portion 14 while withdrawing the tape, the stud or pin 15 can engage in one of the notches, indentations or the like 13 and thereby lock the tape 1. When this has occurred, it is preferable to retain the said upper portion 14 in the depressed position. For this purpose a hook 16 is pivotally mounted on the outside of the housing below the channel 11, and is adapted to be hooked over a projection 17 above the channel 11, by means of which the band retaining stud or pin 15 is held in permanent engagement with a notch, indentation or the like 13 of the tape.

The notches, indentations or the like 13 serving as division markings of the tape 1 make possible a greater accuracy of division than does printing them, as during manufacture, each notch, indentation or the like can serve as a stop which forms the starting point for the production of further notches, indentations or the like.

In order to connect the above described part of the measuring device containing the longer tape 1 to the part containing the shorter tape 6, the housing 4 containing the longer tape is provided with a lateral slot 18 opening on the side opposite to the side opening of the channel 11. The forward end of the short tape 6 is inserted in this slot 18, so that the measuring edge 7 lies against a transverse stop 19. As the opening 5 in the housing 4 of the longer tape consists of an elastic somewhat pliable material, the slot 18 can be so constructed that a certain effort is required to insert the shorter tape 6, which has preferably a cambered cross-sectional shape, into the slot, whereby during subsequent use of the assembled measuring device it is securely retained.

When the two parts of such a measuring device are connected together the device can be used for measuring long lengths. The number of existing larger measuring units (coarse divisions) is then read off the longer tape 1 and the number of smaller measuring units off the shorter tape 6 which can be satisfactorily fixed in any extended position, in any suitable manner, either automatically as described in the specification of the aforesaid prior patent or with the aid of a hand operated lock.

Various modifications are possible, without departing from the scope of the invention as defined in the appended claims.

What I claim is:

1. A measuring device comprising first measuring tape means, an assembly comprising a spool on which the first measuring tape means is wound and from which the first measuring tape means may be unwound varying distances, said assembly further comprising a housing in which said spool is mounted for rotation, second measuring tape means connected to said assembly and extending away from said assembly, means for varying the distance by which the second tape means extends away from said assembly, the first tape means being substantially longer than the second tape means and having relatively coarse measuring divisions thereon which are discontinuities in an otherwise smooth surface of the first tape means, the second tape means having relatively fine measuring divisions thereon, detent means carried by said assembly to engage selectively in said discontinuities to lock said first tape means in any of a plurality of positions of extension corresponding to multiples of whole units of measurement of distance, means releasably interconnecting one end of said second measuring tape means with said housing, and stop means on said housing for precisely locating said one end of said second tape means.

2. A measuring device as claimed in claim 1, said second measuring tape means having an enlargement on said one end thereof, said stop means on said housing precisely locating said enlargement.

3. A measuring device as claimed in claim 2, said housing having a slot opening through one side thereof in a direction parallel to the axis of the spool, said enlargement being removably disposed in said slot and being insertable in and removable from said slot by movement parallel to said axis.

4. A measuring device as claimed in claim 1, said means for varying the distance by which said second tape means extends away from said assembly comprising a second spool individual to said second tape means.

5. A measuring device as claimed in claim 4, said second spool being freely rotatable relative to said assembly and being interconnected to said assembly by a section of said second tape means of variable length.

6. A measuring device as claimed in claim 1, and means resiliently urging said detent means out of engagement with said discontinuities.

7. A measuring device as claimed in claim 6, said resilient urging means comprising a resilient portion of said housing, said portion defining one wall of a channel through which said first tape means can be withdrawn from the housing and being resiliently depressible to engage said detent means in a selected said discontinuity.

8. A measuring device as claimed in claim 7, and means for releasably locking said resilient portion of the housing in a depressed position.

References Cited

UNITED STATES PATENTS

| 8,398 | 9/1851 | Parsons | 33—107 |
| 2,108,251 | 2/1938 | Clark | 33—138 X |
| 2,684,534 | 7/1954 | Ljungberg | 33—138 |
| 2,745,447 | 5/1956 | Studley | 33—138 X |
| 2,840,914 | 7/1958 | Buckelew | 33—138 X |
| 3,164,907 | 1/1965 | Quenot | 33—138 |

FOREIGN PATENTS

| 496,047 | 10/1919 | France. |
| 970,268 | 1/1951 | France. |
| 619,269 | 9/1935 | Germany. |

LEONARD FORMAN, *Primary Examiner.*

J. M. FREED, *Assistant Examiner.*